United States Patent
Vander Ploeg et al.

[15] 3,673,192
[45] June 27, 1972

[54] PROCESS FOR ALKYLATING PERYLENE PIGMENTS

[72] Inventors: John Herman Vander Ploeg; Earl Weener, both of Holland, Mich.

[73] Assignee: Chemetron Corporation, Chicago, Ill.

[22] Filed: Jan. 3, 1969

[21] Appl. No.: 788,921

[52] U.S. Cl. ........................260/281, 106/288 Q, 260/635 R
[51] Int. Cl. .........................................................C07d 39/00
[58] Field of Search................260/281, 279, 274; 106/288 Q

[56] References Cited

UNITED STATES PATENTS

| | | | |
|---|---|---|---|
| 1,200,848 | 10/1916 | Kardos et al. | 260/281 |
| 1,253,252 | 1/1918 | Kardos et al. | 260/281 |
| 2,766,244 | 10/1956 | Brouillard | 260/281 X |
| 3,138,612 | 6/1964 | Kastner | 260/281 X |
| 3,313,491 | 4/1967 | Lucchini et al. | 260/279 X |
| 3,331,847 | 7/1967 | Gerson et al. | 260/281 |
| 3,418,321 | 12/1968 | Gordon | 260/274 |
| 3,446,810 | 5/1969 | Dien et al. | 260/274 X |

*Primary Examiner*—Donald G. Daus
*Attorney*—Nicholas M. Esser

[57] ABSTRACT

A process for simultaneously alkylating and converting a non-pigmentary perylene containing an imido nitrogen group linked to two carbonyl groups to a pigment by reacting the compound with an alkylating agent in the presence of an alkali metal hydroxide and a binding agent. The binding agent is employed in an amount to effect a stiff, plastic mass and the reaction media is heated at an elevated temperature until the reaction is complete whereupon the desired alkylated compound is isolated in a pigmentary form.

10 Claims, No Drawings

3,673,192

PROCESS FOR ALKYLATING PERYLENE PIGMENTS

BACKGROUND OF THE INVENTION

This invention relates to a process for alkylating a non-pigmentary compound and more particularly to a process for the dialkylation of a non-pigmentary perylene tetracarboxylic diimide to a pigmentary dialkyl perylene tetracarboxylic diimide.

There are several routes which can be employed to produce a N,N' dimethyl perylene 3,4,9,10 tetracarboxylic diimide. One method involves the condensation of perylene 3,4,9,10 tetracarboxylic acid dianhydride with monomethyl amine by mixing an excess of an aqueous solution of the amine with the dianhydride and heating at a suitable temperature until the condensation reaction is complete. This procedure is a standard one but produces very crude material which must be further treated to produce a pigmentary product. Another method involves the methylation of the previous stated diimide with methyl chloride in aqueous solution under pressure in an autoclave. This process described in Dutch Pat. No. 6,504,645, has disadvantages in that it requires the use of a pressurized reaction vessel, a long time for the reaction and does not produce a chemically pure product. Another method of alkylating a perylene tetracarboxylic diimide is described in German Pat. No. 276,956 wherein the diimide is reacted with dimethyl sulfate in the presence of molten sodium hydroxide or potassium hydroxide or solutions of these hydroxides. A dye stuff is said to be produced. A solution type process is also described in the Journal of the Chemical Society of Japan, Industrial Chemical Section 54, 479–81 (1951) wherein a dry powder of the disodium salt of perylene tetracarboxylic diimide is boiled with methyl p-toluenesulfonate and sodium carbonate in o-dichlorobenzene.

The process of this invention offers many advantages over the prior art in that a compound can be alkylated and converted to a pigment in a single step. It eliminates the requirements of a pressurized reaction vessel and the use of solvents. The desired product is recovered essentially free from starting material and possesses qualities previously unavailable in a commercial pigment of this type. The product is yellower in shade and stronger in tinting power with a characteristically dark mass tone. It is very transparent and has excellent light fastness making it valuable in the formulation of colors for automotive top coat paints and lacquers.

It is an object of the present invention to provide a novel process for simultaneously alkylating and converting a non-pigmentary compound containing a nitrogen with a replaceable hydrogen to a pigmentary alkylated compound. It is another object of this invention to provide an alkylated imido pigmentary compound which eliminates the requirement of high pressure equipment and can be effected with a minimum amount of handling and processing. It is still another object of the present invention to provide a process for alkylating a perylene tetracarboxylic diimide wherein the resulting compound is strong with a dark mass tone and good light fastness and to produce the compound in an essentially pure product pigmentary form. It is yet another object of this invention to provide an alkylation process for a non-pigmentary diimido compound wherein grinding salt can be eliminated during the reaction and yet a pigmentary product recovered.

SUMMARY OF THE INVENTION

The foregoing objects are accomplished and the shortcomings of the prior art are overcome by the present alkylation process which reacts an imido group contained in a non-pigmentary perylene diimide compound with a stoichiometric excess of an alkylating agent and an alkali metal hydroxide. A binding agent is utilized to effect a stiff, plastic reaction mass. While a reaction is effected between the imido group and the alkylating agent, the alkylated product is subsequently converted to a pigmentary form in the same operation by the stiff, plastic mass containing solid alkali metal hydroxide flakes and salts formed in the reaction. The mixing of the reaction materials in a stiff, plastic mass is carried out at an elevated temperature ranging from about 70° F. to about 250° F. for a period of about 6 to 12 hours, depending upon reaction conditions such as whether a large stoichiometric excess of alkylating agent, binding agent and hydroxide are employed. Depending upon the type of alkylating agent used, the temperature is adjusted so that it is non-volatile under reaction conditions.

DESCRIPTION OF THE PREFERRED EMBODIMENT

Example I

A 2½ gallon jacketed, heavy duty dough mixer of the sigma blade type is charged with 1,500 grams of perylene 3,4,9,10 tetracarboxylic diimide, 600 grams of sodium hydroxide flakes and 1,050 grams of ethylene glycol. The ingredients are stirred in the machine until the mass is heavy, stiff, plastic and dough like. Heat is applied to the jacket of the mixer to effect an internal temperature in the range of 210° to 230° F. and is maintained at this temperature while mixing for 2 hours. The resulting mass is cooled to 160° – 170° F. and 1,125 grams of dimethyl sulfate are added slowly over a 2½ hour period. Immediately thereafter 300 grams of sodium hydroxide flakes are added at one time and stirred for one half hour into the reaction mass followed by 450 grams of dimethyl sulfate added slowly over a 1 hour period. The addition of 300 grams of sodium hydroxide flakes and 450 grams of dimethyl sulfate is repeated as previously indicated for five more incremental additions after which the salt mass containing the desired product is discharged into a plastic tank. Throughout the addition of the dimethyl sulfate the reaction mass is maintained at a temperature of 180° – 230° F. The desired product, N,N' dimethyl 3,4,9,10 perylene tetracarboxylic diimide, is isolated by slurrying the salt cake from the reaction in water, filtering off the salt solution, washing the presscake and drying.

DESCRIPTION OF THE ALTERNATE EMBODIMENTS

EXAMPLE II

Into the same type of apparatus described in Example I, 4,000 grams of powdered micronized sodium chloride salt, 400 grams of perylene 3,4,9,10 tetracarboxylic diimide, 750 grams of ethylene glycol and 150 grams of dimethyl sulfate are charged. The ingredients are stirred for approximately 45 minutes until a stiff plastic, dough like mass is achieved. Thereafter 100 grams of sodium hydroxide flakes are added and the mass allowed to mix for 1 hour during which time cold water is circulated through the jacket of the mixing machine to absorb the heat of reaction and any heat generated by mechanical stirring to maintain a temperature in the range of 210° to 230° F. Every hour thereafter 150 grams of dimethyl sulfate is added over a 5 minute period and is followed immediately by a 100 gram addition of sodium hydroxide flakes at one time, in five incremental additions. The temperature throughout the addition of the dimethyl sulfate is maintained in the range of 180° – 230° F. After the last addition, the machine is allowed to mix for 1 hour and the desired product, N,N' dimethyl perylene 3,4,9,10 tetracarboxylic diimide is isolated as indicated in Example I.

EXAMPLE III

Into the same type of apparatus described in Example I is charged 400 grams of perylene tetracarboxylic diimide, 4,000 grams of powdered sodium chloride salt, 800 grams of propylene glycol and 100 grams of sodium hydroxide. The resulting mixture is mixed for 45 minutes after which time 150 grams of dimethyl sulfate is added over one half hour followed by the addition of 100 grams of sodium hydroxide which is added at one time. The resulting reaction mass is stirred for 1 hour and the addition of dimethyl sulfate and sodium hydroxide is repeated as before indicated until a total of 750 grams of dimethyl sulfate and 500 grams of sodium hydroxide are added. Throughout the addition of the dimethyl sulfate and the sodium hydroxide, 100 grams of propylene glycol is employed to maintain the reaction mass in a softened condition. Cold water is circulated in the jacket of the mixer during the addition of the reaction materials to maintain a temperature of the reaction mass at about 70° F. A total reaction time of 9 hours is employed. The isolation of the desired N,N' dimethyl perylene 3,4,9,10 tetracarboxylic diimide is the same as indicated in Example I.

In the previous examples a certain perylene tetracarboxylic diimide is indicated as being methylated and converted to a pigmentary form. It should be understood that most non-pigmentary compounds containing a nitrogen atom with an acidic replaceable hydrogen can be alkylated in a similar manner with the corresponding alkylating agent. While the preferred alkylating agent is dimethyl sulfate, any di-lower alkyl sulfate in which the alkyl group contains one to six carbon atoms could be employed such as diethyl, di n-propyl, diisopropyl, dibutyl, dipentyl or dihexyl sulfate. Neither is it necessary that a dialkyl sulfate ester be employed. If desired, methyl p-toluene sulfonate could advantageously be employed. All that is required is for the alkylating agent to be non-volatile under reaction conditions.

An important aspect of the described process is that safe guards must be taken to avoid the presence of water during the reaction and working stage as this retards the reaction and necessitates the employment of large quantities of dimethyl sulfate. The rate of reaction is dependent on the efficiency of the grind and it is imperative that the mass be kept fairly stiff so that the grinding of the perylene diimide is always taking place during the reaction.

The preferred inert binding agent is ethylene glycol. However, other glycols in addition to propylene glycol can be utilized such as dipropylene glycol or mixtures of such glycols, without detracting from the advantages of process. Glycerine can be used also, the important characteristic of the inert binding agent being that it is water soluble and not affect pigmentary properties of the end product. While sodium chloride is the preferred inert salt grinding medium in Example II, others commonly utilized for salt grinding such as potassium chloride, sodium sulfate, sodium carbonate or sodium and potassium phosphates can be substituted. Likewise, potassium hydroxide in a solid form can be used in place of sodium hydroxide. As stated previously, the alkali metal hydroxide should be employed in a solid form and while a flake is preferred, solid forms such as pellets or powder can be used.

A heavy duty dough mixer is the preferred apparatus for conducting the process of this invention. However, an apparatus such as the mix muller or heavy duty Dopp Kettle can be substituted.

It will thus be seen that from the present invention there is now provided a process for alkylating and simultaneously converting a non-pigmentary compound containing an imido nitrogen to the pigmentary state which combines two operations into a single one. Because of the condition of the reaction mixture, a product is obtained having pigmentary properties which prior to this invention were achieved only by subsequent periods of long salt grinding. The process of this invention can be carried out in standard equipment which need be utilized for short periods of time and without requiring a pressure type apparatus. Isolation of the desired product is easily effected with high yields.

Others may practice the invention in any of the numerous ways which will be suggested by this disclosure to one skilled in the art by employing one or more of the novel features disclosed or equivalents thereof. All such practice of the invention is considered to be a part hereof provided it falls within the scope of the appended claims.

We claim:

1. A process for alkylating and converting a non-N-alkylated perylene 3,4,9,10-tetracarboxylic diimide to a pigmentary form in a single step consisting essentially of mixing the non-alkylated diimide with an inert salt grinding medium selected from the group consisting of sodium chloride, potassium chloride, sodium sulfate, sodium carbonate, sodium phosphate and potassium phosphate; a solid alkali metal hydroxide, and an alkylating agent selected from the class consisting of a di-lower-alkyl sulfate in which the alkyl group contains from one to six carbon atoms and methyl p-toluene sulfonate in the presence of glycerine or a water-soluble glycol in an amount sufficient to effect a stiff, plastic, doughlike reaction mass at a temperature of from about 70° F. to about 250° F.

2. The process of claim 1 wherein the alkylating agent is a di-lower-alkyl sulfate.

3. The process of claim 1 wherein a water soluble glycol is used as a binding agent to effect the stiff, plastic, doughlike mass.

4. The process of claim 1 wherein the alkali metal hydroxide is sodium hydroxide.

5. The process of claim 2 wherein the alkylating agent is dimethyl sulfate.

6. The process of claim 1 wherein the alkylating agent is methyl p-toluene sulfonate.

7. The process of claim 3 wherein the water soluble glycol is ethylene glycol.

8. The process of claim 3 wherein the water soluble glycol is propylene glycol.

9. The process of claim 2 wherein the alkylating agent is diethyl sulfate.

10. The process of claim 1 wherein the alkylating agent is dimethyl sulfate, the alkali metal hydroxide is sodium hydroxide and the stiff, plastic doughlike mass is effected by the use of ethylene glycol as a binding agent.

* * * * *